United States Patent [19]

Brundage

[11] 3,840,042

[45] Oct. 8, 1974

[54] BUTTERFLY VALVE

[76] Inventor: Ben W. Brundage, 4390 Piedmont Ave., Oakland, Calif. 94611

[22] Filed: Feb. 26, 1973

[21] Appl. No.: 335,883

[52] U.S. Cl. .............. 137/327, 137/454.2, 251/170, 251/306, 251/316

[51] Int. Cl. .............................................. F16k 39/00

[58] Field of Search ...... 137/315, 316, 327, 329.02, 137/454.2, 454.6; 251/170, 171, 305, 306, 307, 308, 316, 317

[56] References Cited

UNITED STATES PATENTS

| | | | |
|---|---|---|---|
| 2,936,778 | 5/1960 | Stillwagon | 251/306 X |
| 2,994,342 | 8/1961 | Stillwagon | 251/306 X |
| 3,118,465 | 1/1964 | Scaramucci | 137/454.2 |
| 3,168,279 | 2/1965 | Anderson et al. | 251/317 |
| 3,667,726 | 6/1972 | Church et al. | 137/315 X |
| 3,737,144 | 6/1973 | Duncan | 251/307 |

*Primary Examiner*—William R. Cline
*Assistant Examiner*—David R. Matthews
*Attorney, Agent, or Firm*—Robert H. Eckhoff

[57] ABSTRACT

A butterfly valve is provided of a construction such that the valve can be disassembled for inspection or repair without being removed from the line.

6 Claims, 7 Drawing Figures

26 41 41 33 31 39 38 38 34

BUTTERFLY VALVE

BACKGROUND OF THE INVENTION

Butterfly valves have become of increasing popularity because of the simplicity in construction requiring fewer operating parts, and because they are of lighter weight and are much less expensive.

SUMMARY OF THE INVENTION

The butterfly valve of the present invention is of such a construction that the valve can be disassembled while in place in a pipeline for inspection or repair. Further, the valve seat is provided by a resilient member maintained in fluid-tight position between opposite side walls, which seat is removable without removing the valve body from the line.

It is in general the broad object of the present invention to provide a butterfly valve construction in which the operating parts of the valve are readily accessible while the valve is in place in a line for repair or inspection.

The invention includes other objects and features of advantage some of which, together with the foregoing, will appear hereinafter.

BRIEF DESCRIPTION OF THE DRAWINGS

In the drawings in which the same numerals are applied to parts of like function.

DESCRIPTION OF THE PREFERRED EMBODIMENT

Figure 1:
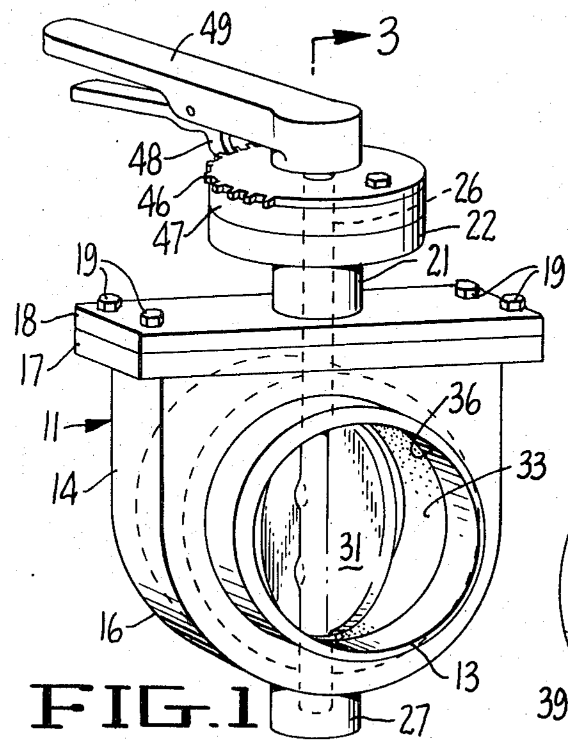
FIG. 1 is a perspective view of an assembled valve.
Figure 2:
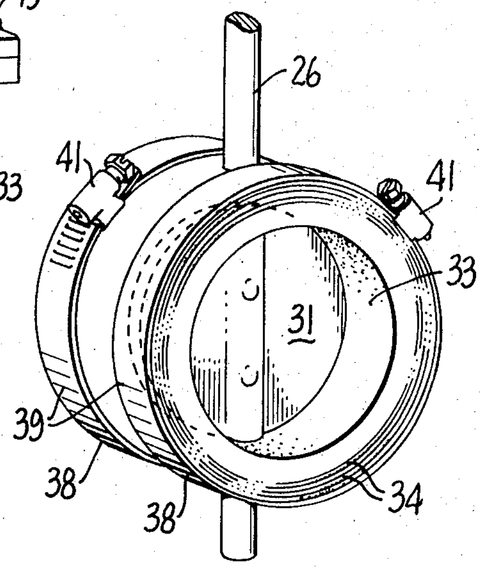
FIG. 2 is a perspective view of the valve seat shown in relation to the valve disc.
Figure 3:
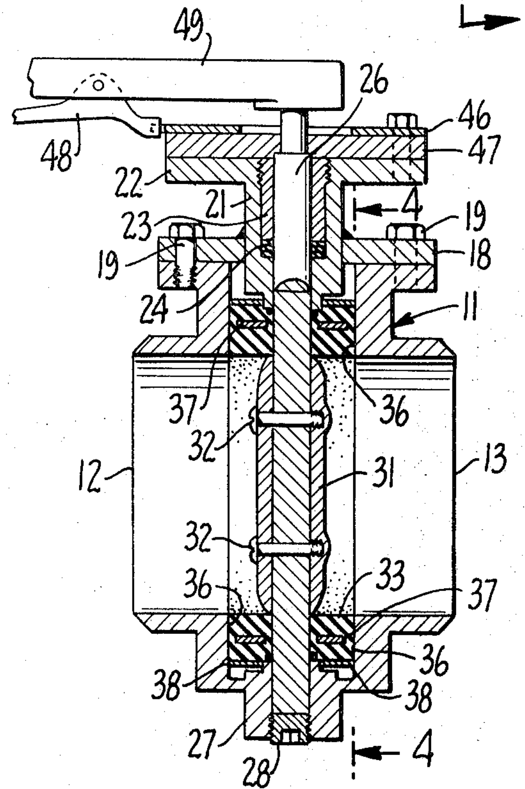
FIG. 3 is a section taken along the line 3—3 in FIG. 1.
Figure 4:
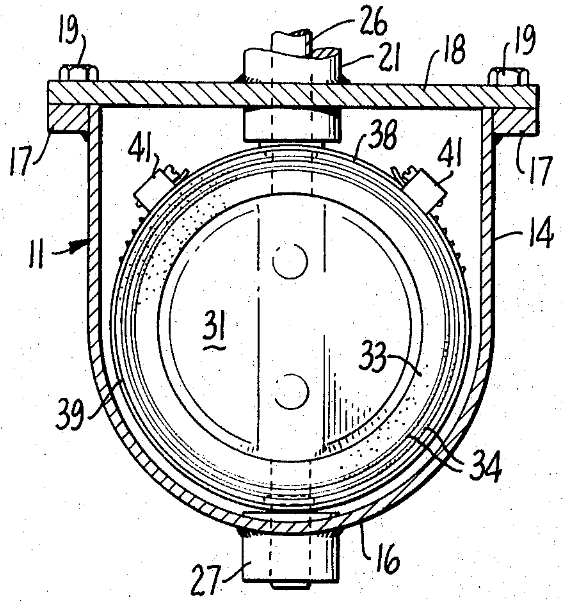
FIG. 4 is a section taken along the line 4—4 in FIG. 3.

In that form of the invention shown in FIGS. 1–4, I provide a valve body, generally indicated at 11, having opposite ends 12 and 13 adapted to be welded in place in a pipeline. Centrally between the ends 12 and 13, I provide parallel side walls 14 extending upwardly from a lower body portion 16. To provide an access opening, the parallel side walls are spaced apart a distance to provide a valve seat cavity. Side walls 14 include flanges 17 on which a cover 18 is held in place by studs 19. Mounted on the cover 18 is a bearing 21 having a flanged top 22. The bearing has a packing gland 23 for retaining packing 24 in position about valve stem 26. The lower end of the valve stem is carried in a bearing 27 on the lower body portion. The bearing is sealed by means of a plug 28. The valve stem carries a flat disc 31 secured in position on the valve stem 26 by screws 32. The valve disc 31 fits snugly within a rubber ring 33 through which the valve stem projects. The opposite faces of the rubber ring include annular ridges 34 fitting against the side walls 14. The ring 33 is inserted and removed through the access opening.

In accordance with this invention, means are provided for holding the rubber ring in fluid-tight engagement with opposite faces 36 in the valve body. To achieve this, I provide within the confines of the rubber ring annular metal rings 37 while about the exterior surface of the ring and on each side thereof I provide a clamp structure, generally indicated at 38, and including a metal band 39, the tension of which is controlled by the screw adjustment 41.

To maintain the valve disc in a given position of adjustment, I mount ratchet plate 46 upon the top of flange 47 which in turn rests upon the flange 22. The ratchet plate has numerous indentations which can be selectively engaged by the latching member 48 mounted on the valve handle 49.

In the use, if it is desired to inspect the valve, it is only necessary to remove ratchet cover 46 and flange 47 after first having removed the valve handle 49. Upon releasing the studs 19, cover 18 and the bearing 21 can be removed thus exposing the clamps 38, 41. When these are released, then the valve disc of the rubber ring element can be removed through the access opening. If any difficulty is experienced in effecting this, it is only necessary to remove the plug 28 and force the valve stem upwardly from the opening provided by removal of the plug 28. It is then a simple matter to effect whatever repair is necessary and this without removing the valve body from the line.

Figure 5:
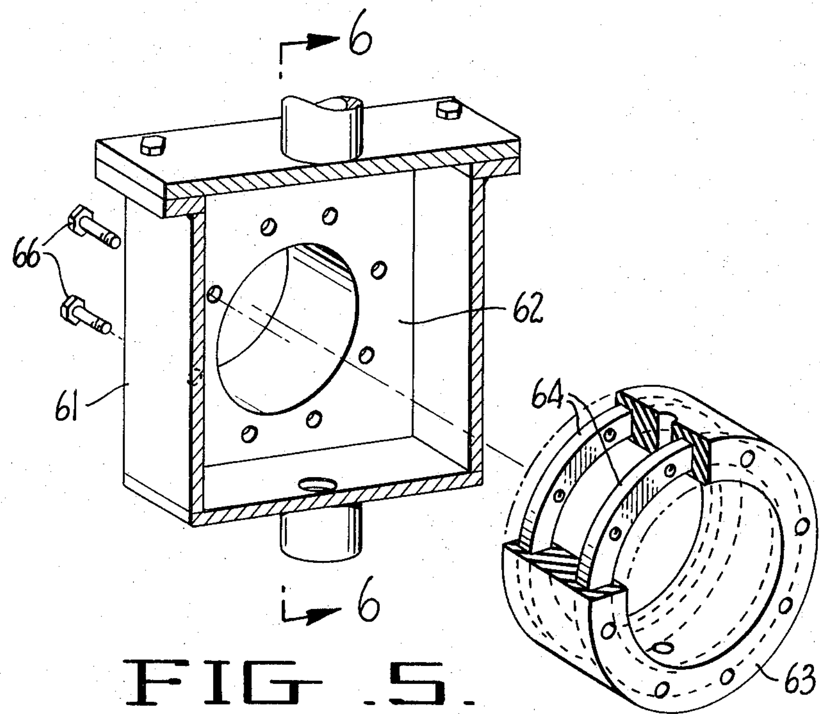
FIG. 5 is a perspective view showing a modified form of the butterfly valve in relation to the member providing the valve seat.
Figure 6:
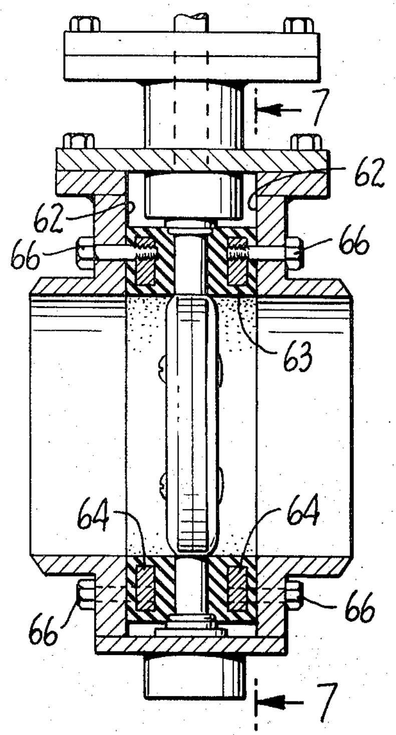
FIG. 6 is a section taken along the line 6—6 in FIG. 5.
Figure 7:
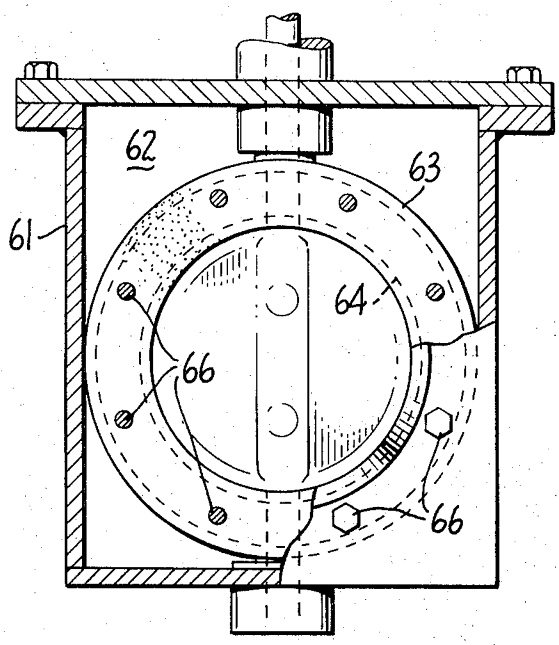
FIG. 7 is a section taken along the line 7—7 in FIG. 6.

In that form of the invention shown in FIGS. 5, 6 and 7, valve body 61 is provided with internal opposite parallel faces 62. Between these I mount a rubber seat ring 63. Spaced annular metal rings 64 are molded internally and on each side of the rubber seat ring. These are pulled against the adjacent side faces 62 of cap screws 66, thus compressing the annular ring and providing a fluid-tight seal between the rubber ring and the opposite side faces. Access to the interior of the valve body is readily secured by removing those parts previously described in connection with the structure of FIGS. 1 through 4.

It is a feature of the valve of the present invention that the body of the valve is sealed so that the material flowing through the pipeline under the control of the valve is contained at all times and cannot leak into the valve body. At the same time, the converse is true; that is, any material in the valve body exteriorly of the rubber rings 33 and 63 cannot pass into the pipeline. Thus, the space about the rings 33 and 63 can be maintained under a positive pressure so that the escape of any material past the rings 33 and 63 cannot occur and, if any leakage does occur, it is into the valve and pipeline rather than in the reverse direction. This enables radioactive waste materials to be handled with safety and with the complete assurance that nothing will escape from the valve. In the case of material such as sulfur which must be maintained in a fluid condition, the space about the rubber rings 33 and 63 can be filled with a suitable heating material such as steam.

I claim:

1. A readily removable and replaceable butterfly valve and seat assembly, comprising: a valve body having a pair of spaced apart parallel side walls defining a valve seat cavity therebetween and having an access opening to the cavity; a substantially ring shaped resilient seat having substantially parallel opposite end surfaces; annular, rigid ring means imbedded in the resilient seat substantially concentric therewith; a butterfly valve pivotally mounted within the seat and cooperable therewith between open and closed positions; and means externally of the seat and engageable therewith to expand the seat in an axial direction into sealing engagement with the valve body side walls.

2. A butterfly valve and seat assembly as in claim 1, wherein the means engageable with the seat to expand it in an axial direction comprises an annular clamp ring disposed about the seat substantially concentric with the rigid ring means and tightenable about the seat to cause said axial expansion of the seat.

3. A butterfly valve and seat assembly as in claim 2, wherein the rigid ring means comprises metal and a pair of rings are embedded within the seat on opposite sides of the butterfly valve adjacent the respective opposite parallel end surfaces of the seat, and a clamp ring is disposed around the seat radially outwardly of each of said rigid metal rings.

4. A butterfly valve and seat assembly as in claim 1, wherein the means engageable with the seat to expand it in an axial direction comprises a plurality of means extended through a portion of the valve body and through the parallel side walls of the valve body into the rigid ring means embedded within the seat, said plurality of means cooperatively engaged with the valve body to draw the rigid ring means toward the parallel side walls of the valve body and thus to expand the seat in an axial direction into sealing engagement with the valve body side walls.

5. A butterfly valve and seat assembly as in claim 4, wherein said rigid ring means comprises metal and said plurality of means comprises a plurality of threaded cap screws extended from outside the valve body through the parallel side walls of the valve body and into threaded engagement with the rigid metal ring means, so that threaded adjustment of the cap screws in a first direction pulls the rigid ring means toward the side walls of the valve body to urge the seat into tight sealing engagement therewith, and threaded adjustment of the cap screws in a second direction releases the rigid ring means to enable the seat to move out of tight sealing engagement with the valve body side walls whereby the seat may be removed from the valve body.

6. A butterfly valve and seat assembly as in claim 5, wherein said rigid ring means includes a pair of rings embedded in the seat on opposite sides of the butterfly valve adjacent the opposite end surfaces of the seat, and a plurality of cap screws are threadably engaged with each of said rings in circumferentially spaced relationship around the rings.

* * * * *